United States Patent
Nakamura et al.

(10) Patent No.: US 11,072,364 B2
(45) Date of Patent: Jul. 27, 2021

(54) STEERING DEVICE

(71) Applicant: NABTESCO CORPORATION, Tokyo (JP)

(72) Inventors: Koji Nakamura, Tsu (JP); Masahiro Takahashi, Tsu (JP); Yuto Nakai, Tsu (JP)

(73) Assignee: NABTESCO CORPORATION, Tokyo (JP)

(*) Notice: Subject to any disclaimer, the term of this patent is extended or adjusted under 35 U.S.C. 154(b) by 213 days.

(21) Appl. No.: 16/196,525

(22) Filed: Nov. 20, 2018

(65) Prior Publication Data

US 2019/0152519 A1 May 23, 2019

(30) Foreign Application Priority Data

Nov. 21, 2017 (JP) .............................. JP2017-224056

(51) Int. Cl.
*B62D 5/04* (2006.01)
*F16H 1/32* (2006.01)

(52) U.S. Cl.
CPC ......... *B62D 5/0484* (2013.01); *B62D 5/0421* (2013.01); *B62D 5/0433* (2013.01);
(Continued)

(58) Field of Classification Search
CPC .. B62D 5/0484; B62D 5/0421; B62D 5/0433; B62D 5/0454; B62D 5/0463; F16H 1/32
See application file for complete search history.

(56) References Cited

U.S. PATENT DOCUMENTS 2,820,872 A * 1/1958 Carr ..................... B62D 5/0478
338/47
5,267,625 A * 12/1993 Shimizu ................. B62D 1/166
180/443
(Continued)

FOREIGN PATENT DOCUMENTS

DE 102012213444 A1 2/2013
GB 755484 A 8/1956
(Continued)

OTHER PUBLICATIONS

Extended European Search Report EP Application No. 18207534.1 dated Apr. 12, 2019.

*Primary Examiner* — Kevin Hurley
*Assistant Examiner* — Micheal R Stabley
(74) *Attorney, Agent, or Firm* — Pillsbury Winthrop Shaw Pittman, LLP

(57) ABSTRACT

One object is to provide a steering device that facilitates disengagement of a speed reducer so that, for example, when the speed reducer fails, the speed reducer can be disengaged to enable steering of a vehicle with a manual operational force alone. This application relates to a steering device provided with a steering mechanism and a speed reducer. The steering mechanism steers tires of a vehicle under a steering force from a steering wheel. The speed reducer is connected to a motor for outputting a steering assistance force corresponding to the steering force. The speed reducer enlarges the steering assistance force and transmits the enlarged steering assistance force to the steering mechanism. The speed reducer is connected to the steering mechanism via a speed reducer arm.

5 Claims, 5 Drawing Sheets

(52) U.S. Cl.
CPC ......... *B62D 5/0454* (2013.01); *B62D 5/0463* (2013.01); *F16H 1/32* (2013.01)

(56) References Cited

U.S. PATENT DOCUMENTS

| | | | | |
|---|---|---|---|---|
| 7,475,891 | B2 * | 1/2009 | Lambert | B62D 7/16 |
| | | | | 280/93.51 |
| 8,360,197 | B2 * | 1/2013 | Escobedo | B62D 5/0454 |
| | | | | 180/444 |
| 2010/0276901 | A1 * | 11/2010 | Richardson | B60G 3/20 |
| | | | | 280/93.512 |
| 2013/0032430 | A1 | 2/2013 | Zaloga et al. | |

FOREIGN PATENT DOCUMENTS

| | | |
|---|---|---|
| JP | 49-24614 | 6/1974 |
| JP | 9-58491 A | 3/1997 |
| JP | 2013-035475 A | 2/2013 |

\* cited by examiner

STEERING DEVICE

CROSS-REFERENCE TO RELATED APPLICATIONS

This application is based on and claims the benefit of priority from Japanese Patent Application Serial No. 2017-224056 (filed on Nov. 21, 2017), the contents of which are hereby incorporated by reference in their entirety.

TECHNICAL FIELD

The present invention relates to a steering device.

BACKGROUND

Steering assistance devices are installed on various vehicles to assist steering of drivers. As such a steering assistance device, there has been used a device that transmits a steering assistance force to a steering mechanism by using a torque sensor, a motor, and a speed reducer.

The torque sensor detects a torque produced in a steering shaft by steering of a driver. The motor produces a driving force corresponding to the detected torque. The driving force is transmitted to the steering mechanism through the speed reducer. Since the speed reducer enlarges the torque transmitted from the motor to the steering mechanism, the driver can steer a vehicle with a light force. Japanese Patent Application Publication No. 2013-35475 ("the '475 Publication") proposes the use of a planetary gear device as the speed reducer.

The '475 Publication discloses an electric power steering device using an oscillating internal contact-type planetary gear device and requiring a smaller installation space.

The speed reducer, however, has presented the following problem. That is, particularly when built in a steering assistance device installed in a vehicle having a large weight (for example, a five-ton truck), the speed reducer is subjected to an extremely large load. With the conventional configuration, however, in a case of a failure of the speed reducer, since a pinion of the speed reducer meshes with a rack shaft, recovering from the failure requires that the speed reducer be demounted to disengage the pinion from the rack shaft, thus being excessively time-consuming and troublesome.

SUMMARY

The present invention addresses the above-described circumstances, and an object thereof is to provide a steering device that facilitates disengagement of a speed reducer so that, for example, when the speed reducer fails, the speed reducer can be disengaged to enable steering of a vehicle with a manual operational force alone.

A steering device according to one embodiment of the present invention is provided with a steering wheel for receiving a steering force, a steering mechanism for steering tires of a vehicle under the steering force, a motor for outputting a steering assistance force corresponding to the steering force, and a speed reducer for enlarging the steering assistance force and transmitting the enlarged steering assistance force to the steering mechanism. The speed reducer is connected to the steering mechanism via a speed reducer arm.

The steering device according to one embodiment of the present invention is configured so that the speed reducer is disconnected from the steering mechanism by disengaging the speed reducer from the speed reducer arm or by disengaging the steering mechanism from the speed reducer arm.

The steering device according to one embodiment of the present invention is configured so that when disconnected from the speed reducer, the steering mechanism steers the tires with the steering force of the steering wheel alone.

The steering device according to one embodiment of the present invention is further provided with a gearbox having a gearbox arm, the gearbox being provided between the steering wheel and the steering mechanism, and both the gearbox arm and the speed reducer arm are connected to the steering mechanism via a coupling rod.

The steering device according to one embodiment of the present invention is further provided with a gearbox having a gearbox arm, the gearbox being provided between the steering wheel and the steering mechanism, and the gearbox arm is connected to the steering mechanism via a gearbox coupling rod, while the speed reducer arm is connected to the steering mechanism via a speed reducer coupling rod.

The steering device according to one embodiment of the present invention is configured so that the steering mechanism is a tie rod.

Advantages

According to the steering device of one embodiment of the present invention, disengagement of a speed reducer is facilitated so that, for example, when the speed reducer fails, the speed reducer can be disengaged to enable steering of a vehicle with a manual operational force alone.

DESCRIPTION OF THE PREFERRED EMBODIMENTS

Embodiments of the present invention will now be described with reference to the appended drawings.

Figure 1:
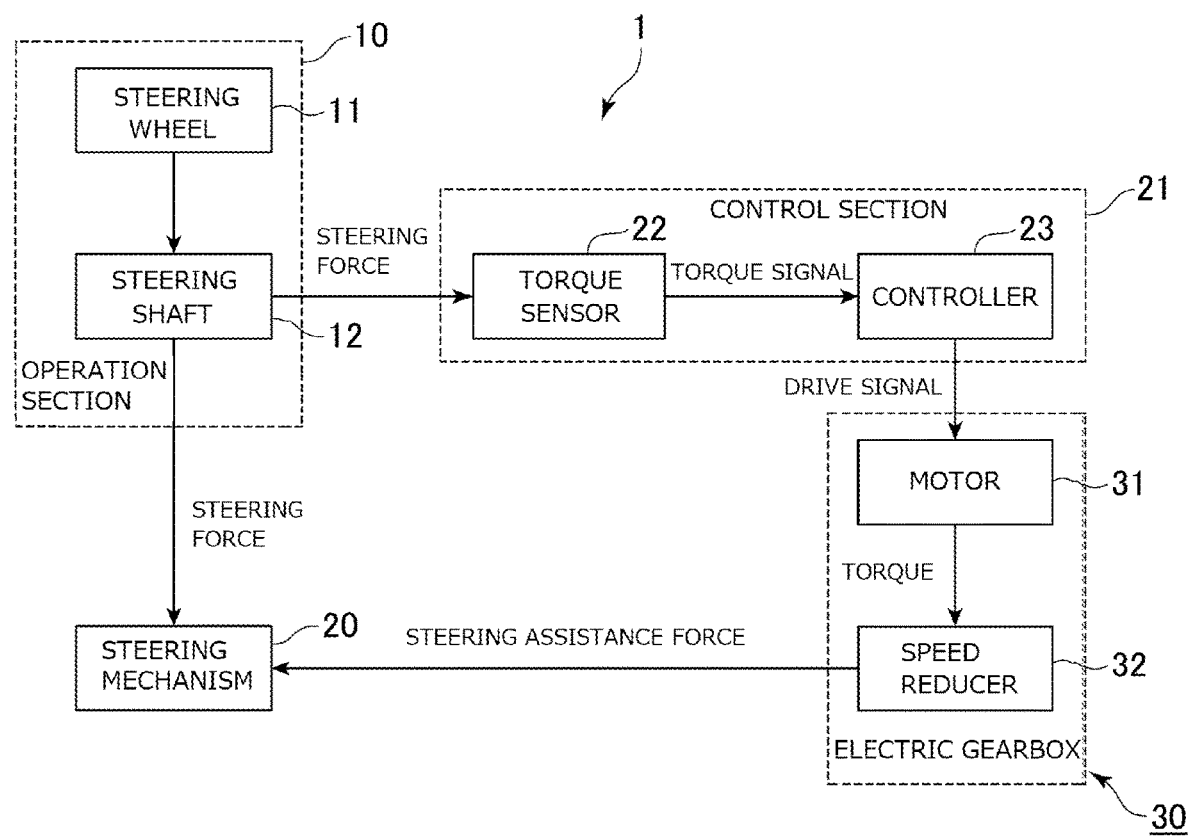
FIG. 1 is a schematic block diagram showing a steering device of one embodiment of the present invention.

FIG. 1 is a schematic block diagram showing a steering device 1 according to one embodiment of the present invention.

The steering device 1 shown includes an operation section 10, a steering mechanism 20, a control section 21, and an electric gearbox 30.

The operation section 10 is configured to include a steering wheel 11 and a steering shaft 12. A driver grips the steering wheel 11. To steer a vehicle (not shown), the driver rotates the steering wheel 11. The steering shaft 12 is mechanically connected to the steering wheel 11 and the steering mechanism 20. A steering force applied to the steering wheel 11 by a rotational operation performed by the driver is transmitted to the steering mechanism 20 through the steering shaft 12. A gear box (e.g., a gear box 2 described later) and a coupling rod (e.g., a coupling rod 8 described later) may be provided between the steering shaft 12 and the steering mechanism 20.

The steering mechanism 20 is configured to transmit the steering force applied to the steering wheel 11 to tires (not shown) of the vehicle to steer the tires of the vehicle. A force for steering the tires is adjusted in accordance with the magnitude of the steering force of the driver. Various design forms of mechanical coupling structures are conceivable for the steering wheel 11, the steering shaft 12, the steering mechanism 20, and the tires, and these design forms can be applied as appropriate. The steering mechanism 20 may include a tie rod (e.g., a tie rod 9 described later).

The control section 21 is configured to include a torque sensor 22 and a controller 23. The torque sensor 22 detects a torque produced in the steering shaft 12. Various forms of the torque sensor 22 are conceivable without any limitation to a particular type thereof.

In order to detect a torque produced in the steering shaft 12, the torque sensor 22 may be directly connected to the steering shaft 12 but need not be directly connected to the steering shaft 12. Various forms of mechanical or electrical connection structures between the torque sensor 22 and the steering shaft 12 are conceivable without any limitation to a particular connection structure.

The controller 23 controls the electric gearbox 30 in accordance with a torque signal. In accordance with the magnitude of a torque indicated by the torque signal, the controller 23 controls the electric gearbox 30 to output a steering assistance force. The steering assistance force is eventually transmitted to the steering mechanism 20. Thus, the driver can steer the vehicle with a small force. The controller 23 is capable of processing the torque signal and generating a drive signal for driving the electric gearbox 30. Various forms of operations of the controller 23 are conceivable without any limitation to a particular form.

The electric gearbox 30 is configured to include a motor 31 and a speed reducer 32. The above-mentioned drive signal is outputted from the controller 23 to the motor 31. The motor 31 rotates in accordance with the drive signal and outputs a steering assistance force designated by the drive signal. The steering assistance force outputted from the motor 31 varies in accordance with the steering force applied to the steering shaft 12.

The steering assistance force from the motor 31 is inputted to the speed reducer 32. The speed reducer 32 enlarges the steering assistance force from the motor 31 and transmits the enlarged steering assistance force to the steering mechanism 20. Thus, the driver can be assisted by the steering assistance force to steer the tires of the vehicle with a small force.

In the steering device 1 shown, various configurations are conceivable for the operation section 10, the steering mechanism 20, the control section 21, and the electric gearbox 30 without any limitation to particular configurations.

Figure 2:
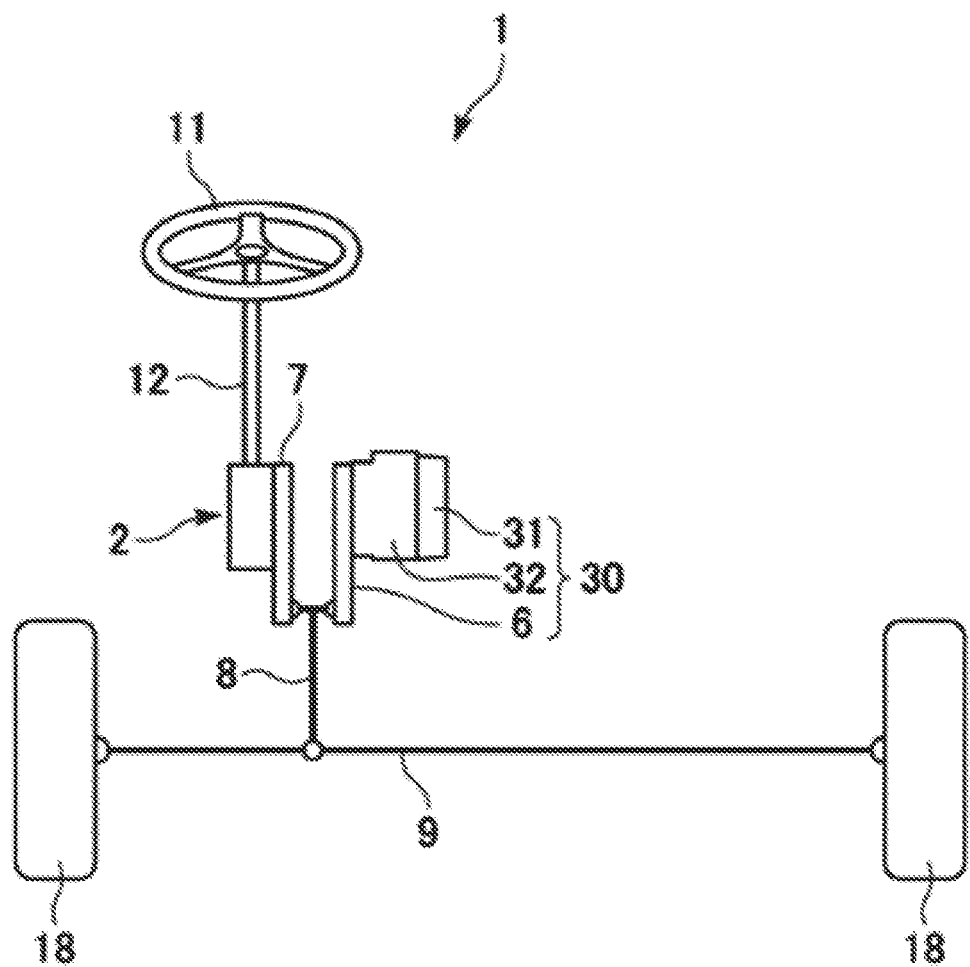
FIG. 2 is a schematic view of a steering device according to one embodiment of the present invention.

Next, FIG. 2 shows a schematic view of a steering device 1 according to one embodiment of the present invention.

The steering device 1 shown according to one embodiment of the present invention includes a steering wheel 11, a steering shaft 12, a gearbox 2, an electric gearbox 30, a coupling rod 8, and a tie rod 9. The tie rod 9 is an example of the steering mechanism 20. In FIG. 2, the control section 21 is omitted.

A driver operates the steering wheel 11 to apply a steering force, and then the steering force is transmitted to the gearbox 2 via the steering shaft 12. The gearbox 2 is formed of a gearbox of a known type and typically includes various types of constituent members such as a rack-and-pinion, a ball screw, and a worm gear. The gearbox 2 according to one embodiment of the present invention is provided with a gearbox arm 7 and is connected to the coupling rod 8 via the gearbox arm 7. This connection can be established by any method including screw fastening without any limitation to a particular method.

A torque outputted from the gearbox 2 is transmitted to the tie rod 9 via the coupling rod 8 and used to steer the tires 18 of the vehicle.

The electric gearbox 30, on the other hand, includes a motor 31, a speed reducer (eccentric oscillating speed reducer) 32, and a speed reducer arm (pitman arm) 6. A steering assistance force outputted from the motor 31 is enlarged by the speed reducer 32, and the enlarged steering assistance force is transmitted to the speed reducer arm 6. The speed reducer arm 6 connects the electric gearbox 30 to the coupling rod 8. This connection can be established by any method including screw fastening without any limitation to a particular method. The steering assistance force is transmitted from the speed reducer arm 6 to the tie rod 9 via the coupling rod 8. Thus, the driver can be assisted by the steering assistance force to steer the tires of the vehicle with a small force.

The speed reducer 32 can be disconnected from the tie rod 9 by disengaging the speed reducer 32 from the speed reducer arm 6 or by disengaging the tie rod 9 from the speed reducer arm 6. Thus, disengagement of the speed reducer is facilitated so that, for example, when the speed reducer fails, the speed reducer can be disengaged to enable steering of a vehicle with a manual operational force alone.

As mentioned above, in the example shown, both the gearbox arm 7 and the speed reducer arm 6 are connected to the tie rod 9 via the common coupling rod 8. By sharing a coupling rod in this manner, it becomes possible to reduce the number of components of the steering device 1.

Figure 3:
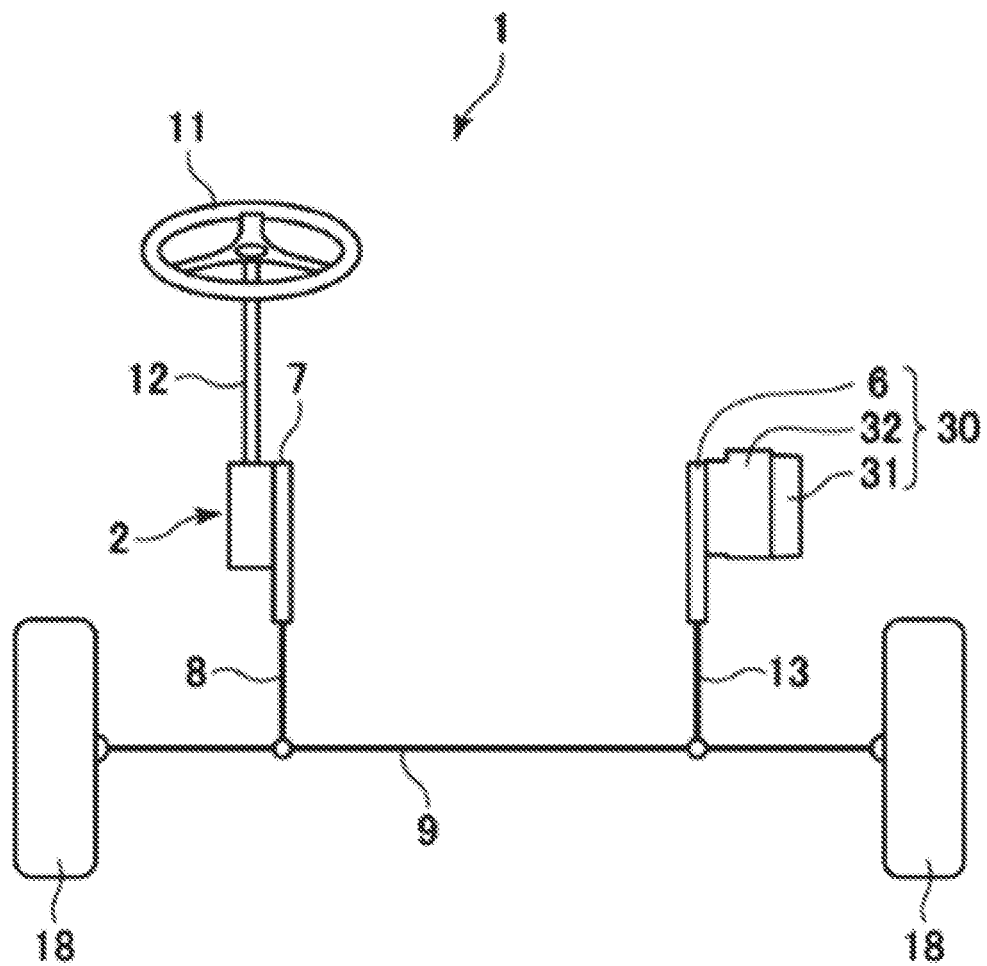
FIG. 3 is a schematic view of another steering device according to one embodiment of the present invention.

Next, FIG. 3 shows a schematic view of another steering device 1 according to one embodiment of the present invention.

Similarly to the case shown in FIG. 2, the steering device 1 shown according to one embodiment of the present invention includes a steering wheel 11, a steering shaft 12, a gearbox 2, an electric gearbox 30, a coupling rod 8, and a tie rod 9.

A driver operates the steering wheel 11 to apply a steering force, and then the steering force is transmitted to the gearbox 2 via the steering shaft 12.

A torque outputted from the gearbox 2 is transmitted to the tie rod 9 via the coupling rod 8 as a gearbox coupling rod and used to steer the tires 18 of the vehicle.

The electric gearbox 30, on the other hand, includes a motor 31, a speed reducer (eccentric oscillating speed reducer) 32, and a speed reducer arm (pitman arm) 6. A steering assistance force outputted from the motor 31 is enlarged by the speed reducer 32, and the enlarged steering assistance force is transmitted to the speed reducer arm 6. The speed reducer arm 6 is connected to a speed reducer coupling rod 13 different from the coupling rod 8. This connection can be established by any method including screw fastening without any limitation to a particular method. The steering assistance force is transmitted from the seed reducer arm 6 to the tie rod 9 via the coupling rod 13. Thus, the driver can be assisted by the steering assistance force to steer the tires of the vehicle with a small force.

In the steering device 1 shown according to one embodiment of the present invention, the gearbox arm 7 is connected to the tie rod 9 via the gearbox coupling rod 8, and the speed reducer arm 6 is connected to the tie rod 9 via the speed reducer coupling rod 13.

The speed reducer 32 can be disconnected from the tie rod 9 by disengaging the speed reducer 32 from the speed reducer arm 6 or by disengaging the tie rod 9 from the speed reducer arm 6. Thus, disengagement of the speed reducer is facilitated so that, for example, when the speed reducer fails, the speed reducer can be disengaged to enable steering of a vehicle with a manual operational force alone.

As mentioned above, in the example shown, the gearbox arm 7 and the speed reducer arm 6 are connected to the tie rod 9 via the different coupling rods 8 and 13, respectively. It is, therefore, possible to arrange the electric gearbox 30 including the speed reducer 32 at any position and thus to improve the degree of freedom in designing a vehicle.

Figure 4:
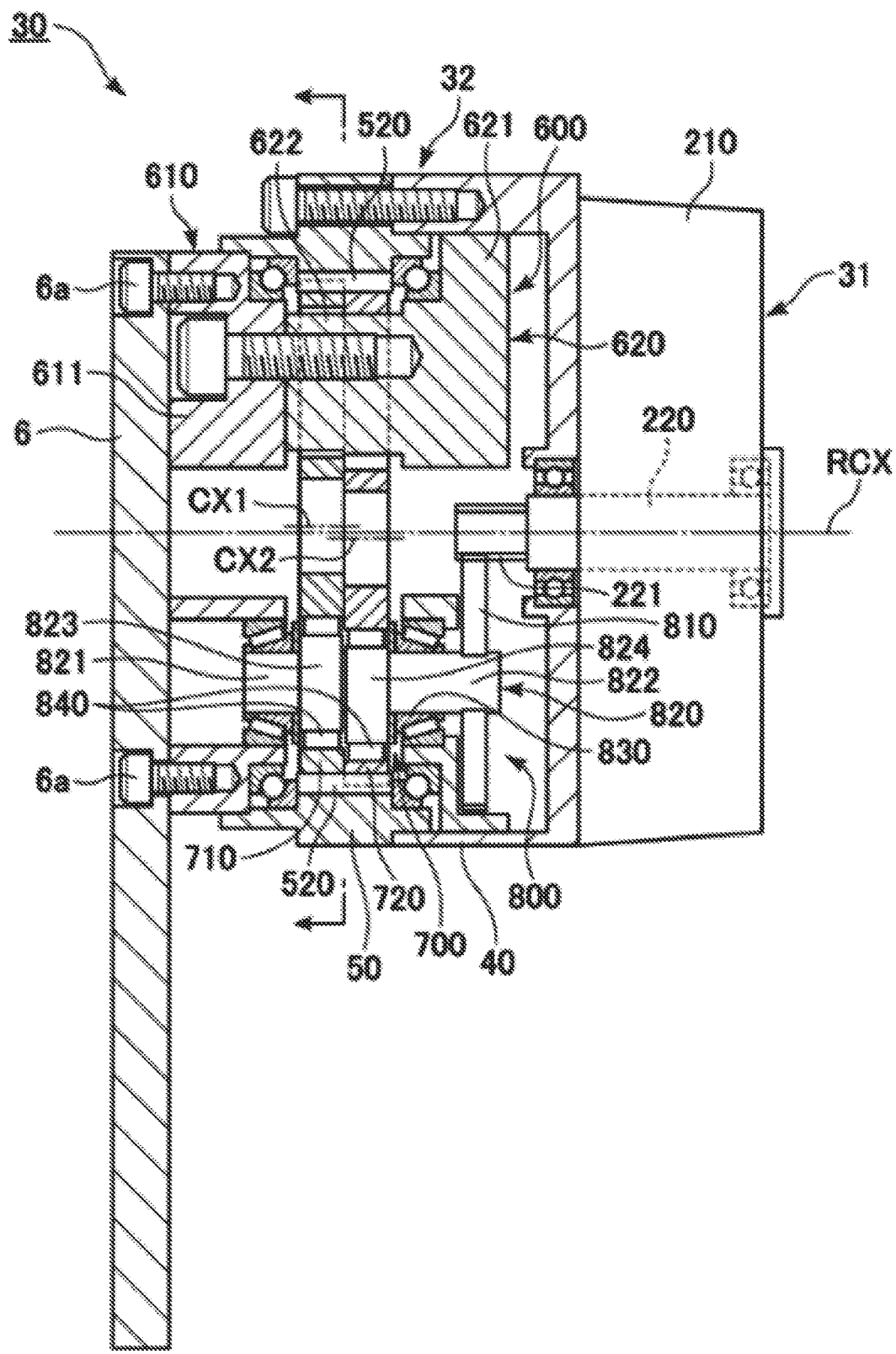
FIG. 4 is a schematic view of an electric gearbox according to one embodiment of the present invention.

Next, FIG. 4 is a schematic sectional view of the electric gearbox 30.

The electric gearbox 30 includes the motor 31, the speed reducer (eccentric oscillating speed reducer) 32, and the speed reducer arm 6. As mentioned above, the speed reducer arm 6 is mounted to the speed reducer 32 by a known method including screw fastening. Furthermore, the electric gearbox 30 includes a mounting cylinder 40, and the mounting cylinder 40 is used to mount the motor 31 to the speed reducer 32.

The motor 31 includes a casing 210 and a motor shaft 220. In the casing 210, there are arranged various components used in conventional motors (for example, a coil and a stator core). The principle of this embodiment is not limited to a particular structure in the casing 210.

The motor shaft 220 extends toward the speed reducer 32. A gear section 221 is formed at the end of the motor shaft 220. The gear section 221 meshes with the speed reducer 32. As a result, a torque produced by the motor 31 is transmitted to the speed reducer 32.

As shown in FIG. 4, the speed reducer 32 includes an outer cylinder 50, a carrier 600, a gear portion 700, three drive mechanisms 800 (FIG. 4 shows one of the three drive mechanisms 800), and two primary bearings 900 (not shown).

Figure 5:
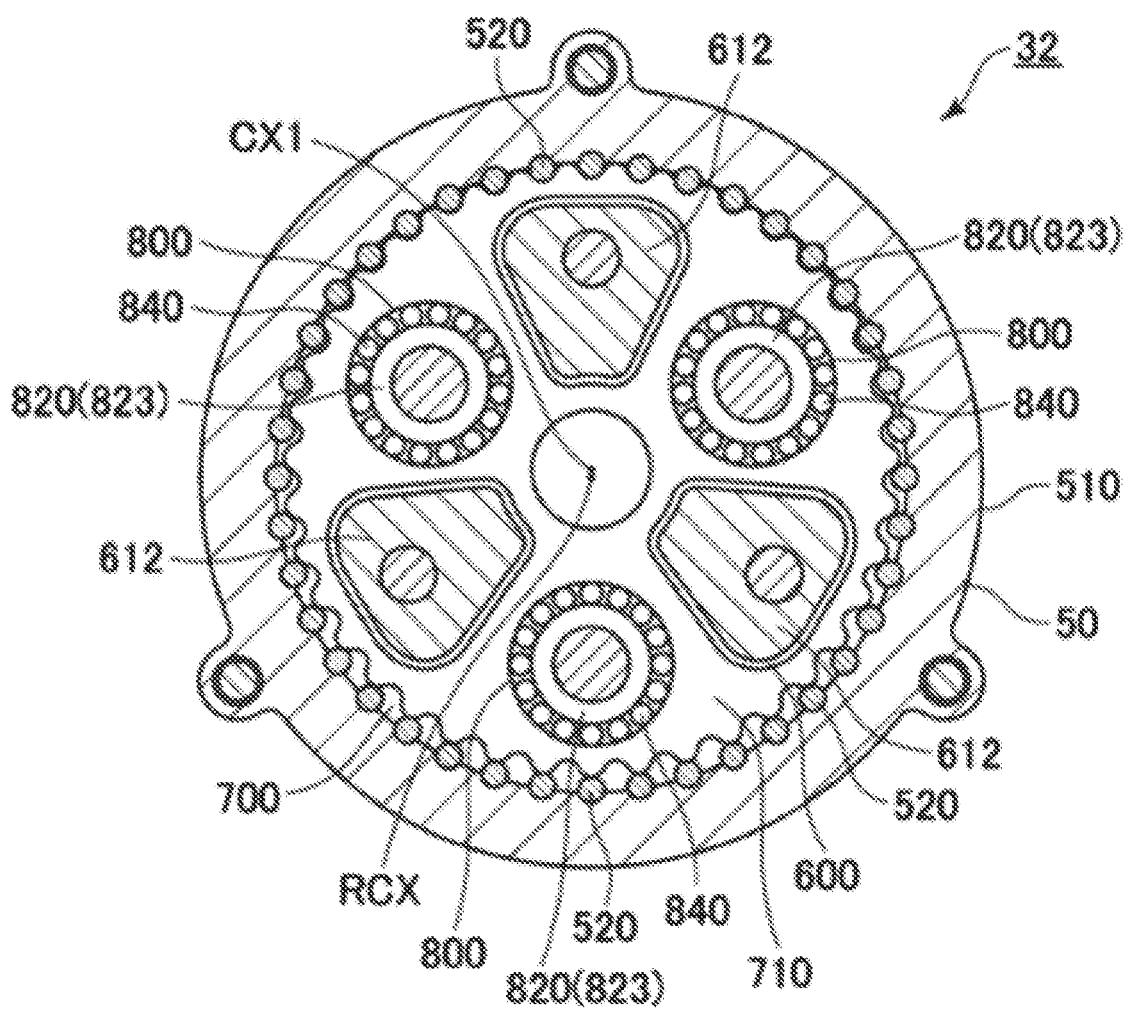
FIG. 5 is a schematic sectional view of a speed reducer of the electric gearbox shown in FIG. 4.

As shown in FIG. 5, the outer cylinder 50 includes a case 510 having a substantially cylindrical shape and a plurality of internal tooth pins 520. The case 510 defines a cylindrical internal space in which the carrier 600, the gear portion 700, and the drive mechanisms 800 are arranged. The plurality of internal tooth pins 520 are arranged circularly along an inner peripheral surface of the case 510 to form an internally toothed ring. In the embodiment, the internal tooth pins 520 are examples of internal teeth.

FIG. 5 shows a rotation center axis RCX of the carrier 600 and the motor shaft 220. Each of the internal tooth pins 520 is made of a cylindrical member extending along an extending direction of the rotation center axis RCX. Each of the internal tooth pins 520 is fitted in a groove formed in an inner wall of the case 510. Therefore, each of the internal tooth pins 520 is appropriately retained by the case 510.

As shown in FIG. 5, the plurality of internal tooth pins 520 are arranged around the rotation center axis RCX at substantially regular intervals. Each of the internal tooth pins 520 has a semicircle surface projecting from the inner wall of the case 510 toward the rotation center axis RCX. Therefore, the plurality of internal tooth pins 520 serve as internal teeth meshing with the gear portion 700.

As shown in FIG. 4, the carrier 600 includes a base portion 610 and an end plate portion 620. The base portion 610 is arranged between the end plate portion 620 and the speed reducer arm 6. The end plate portion 620 is arranged between the base portion 610 and the motor 31. The carrier 600 as a whole has a cylindrical shape. The carrier 600 rotates about the rotation center axis RCX within the outer cylinder 50.

The base portion 610 includes a base plate portion 611 having a ring-like shape. The end plate portion 620 includes a base plate portion 621 having a ring-like shape and three shaft portions 622 each extending from the base plate portion 621 toward the base portion 610. The based portion 610 is connected to each of base end surfaces of the three shaft portions 622. The base portion 610 may be connected to each of the base end surfaces of the three shaft portions 622 by a reamer bolt, a locating pin, or other techniques.

The gear portion 700 is arranged between the base plate portion 611 of the base portion 610 and the base plate portion 621 of the end plate portion 620. The three shaft portions 622 extend through the gear portion 700 and are connected to the end plate portion 620.

The gear portion 700 includes a first trochoid gear 710 and a second trochoid gear 720. The first trochoid gear 710 is arranged between the base plate portion 611 and the second trochoid gear 720. The second trochoid gear 720 is arranged between the end plate portion 620 and the first trochoid gear 710. As shown in FIG. 5, a part of a plurality of external teeth of the first trochoid gear 710 mesh with the internally toothed ring formed of the plurality of internal tooth pins 520.

The rotation of the motor shaft 220 is transmitted to the first trochoid gear 710 and the second trochoid gear 720 by the drive mechanisms 800. As a result, the first trochoid gear 710 and the second trochoid gear 720 rotate so as to oscillate horizontally.

FIG. 4 shows a center axis CX1 of the first trochoid gear 710 and a center axis CX2 of the second trochoid gear 720. The center axes CX1 and CX2 extend substantially in parallel with the rotation center axis RCX of the carrier 600. FIG. 5 shows the center axis CX1 of the first trochoid gear 710. During the above-mentioned oscillating rotation, the center axes CX1 and CX2 revolve around the rotation center axis RCX of the carrier 600. Therefore, the first trochoid gear 710 and the second trochoid gear 720 revolve within the case 510 while meshing with the internal tooth pins 520. Simultaneously, the first trochoid gear 710 and the second trochoid gear 720 contact with the three shaft portions 622 of the carrier 600 and cause the carrier 600 to rotate around the rotation center axis RCX thereof.

The center axis CX2 of the second trochoid gear 720 may revolve around the rotation center axis RCX of the carrier 600 out of phase with the center axis CX1 of the first trochoid gear 710.

The base portion 610 is mounted at its end portion to the speed reducer arm 6. This mounting may be accomplished by fastening a screw 6a as shown in FIG. 4 or by any other method. Thus, the steering assistance force outputted from the motor 31 is transmitted to the speed reducer arm 6 by the speed reducer 32.

As shown in FIG. 4, each of the three drive mechanisms 800 includes an input gear 810, a crank shaft 820, two journal bearings 830, and two crank bearings 840. The input gear 810 meshes with the gear section 221 of the motor shaft 220 and receives a torque from the motor 31. Unlike the first trochoid gear 710 and the second trochoid gear 720, the input gear 810 is a spur wheel. Alternatively, the input gear 810 may be other types of gear components. The principle of the embodiment is not limited to a particular type of gear component used as the input gear 810.

A reduction ratio determined by the input gear 810 and the gear section 221 of the motor shaft 220 may be smaller than a reduction ratio determined by the above-mentioned internally toothed ring and the gear portion 700. In one embodiment of the present invention, a first reduction ratio is described as a reduction ratio determined by the input gear 810 and the gear section 221 of the motor shaft 220. Furthermore, a second reduction ratio is described as a reduction ratio determined by the internally toothed ring and the gear portion 700.

When the input gear 810 rotates, the crank shaft 820 rotates. As a result, a first eccentric portion 823 and a second eccentric portion 824 rotate eccentrically. Simultaneously, the first trochoid gear 710 connected to the first eccentric portion 823 via one of the crank bearings 840 can revolve within the outer cylinder 50 while meshing with the plurality of internal tooth pins 520. Likewise, the second trochoid gear 720 connected to the second eccentric portion 824 via the other crank bearing 840 can revolve within the outer cylinder 50 while meshing with the plurality of internal tooth pins 520. As a result, the first trochoid gear 710 and the second trochoid gear 720 can rotate so as to oscillate horizontally within the outer cylinder 50. In the embodiment, a crank mechanism is described as being composed of the crank shaft 820 and the two crank bearings 840.

The crank shaft 820 shown in FIG. 4 includes a first journal 821, a second journal 822, the first eccentric portion 823, and the second eccentric portion 824. The first journal 821 is encircled by the base plate portion 611 of the carrier 600. The second journal 822 is encircled by the base plate portion 621 of the end plate portion 620 of the carrier 600. One of the two journal bearings 830 is arranged between the first journal 821 and the base plate portion 611. The other of the two journal bearings 830 is arranged between the second journal 822 and the end plate portion 620. In addition, the above-mentioned input gear 810 is mounted on the second journal 822.

The examples of the embodiments of the present invention have been described above. The above-mentioned various embodiments are not limited to the configurations described above and can be applied to various types of steering devices. Some of the various features described for any one of the above-mentioned various embodiments may be applied to the steering device described for another of the embodiments.

What is claimed is:

1. A steering device, comprising:
   a steering mechanism configured to steer tires of a vehicle under a steering force from a steering wheel;
   a speed reducer connected to a motor configured to output a steering assistance force corresponding to the steering force, the speed reducer being configured to enlarge the steering assistance force and transmit the enlarged steering assistance force to the steering mechanism, and
   a gearbox having a gearbox arm, the gearbox being provided between the steering wheel and the steering mechanism,
   wherein the speed reducer is connected to the steering mechanism via a speed reducer arm; and
   wherein both the gearbox arm and the speed reducer arm are connected to the steering mechanism via a coupling rod,
   wherein the coupling rod includes a gearbox coupling rod and a speed reducer coupling rod,
   wherein the gearbox arm is connected to the steering mechanism the gearbox coupling rod, while the speed reducer arm is connected to the steering mechanism via the speed reducer coupling rod,
   wherein the gearbox coupling rod is configured to transmit the steering force from the steering wheel, via the gearbox arm, to the steering mechanism, and
   wherein the speed reducer coupling rod is configured to transmit the steering assistance force corresponding to the steering force from the speed reducer, via the speed reducer arm, to the steering mechanism.

2. The steering device according to claim 1, wherein the speed reducer is disconnected from the steering mechanism by disengaging the speed reducer from the speed reducer arm or by disengaging the steering mechanism from the speed reducer arm.

3. The steering device according to claim 2, wherein, when disconnected from the speed reducer, the steering mechanism is configured to steer the tires with the steering force of the steering wheel alone.

4. A steering device, comprising:
   a steering mechanism configured to steer tires of a vehicle under a steering force from a steering wheel;
   a speed reducer connected to a motor configured to output a steering assistance force corresponding to the steering force, the speed reducer being configured to enlarge the steering assistance force and transmit the enlarged steering assistance force to the steering mechanism, and
   a gearbox having a gearbox arm, the gearbox being provided between the steering wheel and the steering mechanism,
   wherein the speed reducer is connected to the steering mechanism via a speed reducer arm; and
   wherein both the gearbox arm and the speed reducer arm are connected to the steering mechanism via a coupling rod,
   wherein the steering mechanism comprises a tie rod,
   wherein the speed reducer arm and the gear box arm are both connected to the tie rod via the coupling rod, and
   wherein the coupling rod is configured to both transmit the steering force from the steering wheel, via the gearbox arm, and transmit the steering assistance force corresponding to the steering force from the speed reducer, via the speed reducer arm, to the tie rod.

5. The steering device according to claim 4, wherein the speed reducer is disconnected from the steering mechanism by disengaging the speed reducer from the speed reducer arm or by disengaging the steering mechanism from the speed reducer arm, and
   wherein, when disconnected from the speed reducer, the steering mechanism is configured to steer the tires with the steering force of the steering wheel alone.

* * * * *